United States Patent Office 3,377,330
Patented Apr. 9, 1968

3,377,330
ETHYLENE POLYMERIZATION IN THE PRESENCE OF A FREE-RADICAL CATALYST AND AS A CHAIN-TRANSFER AGENT A MINOR AMOUNT OF PHOSPHINE
George A. Mortimer, La Marque, Tex., assignor to Monsanto Company, St. Louis, Mo., a corporation of Delaware
No Drawing. Filed Dec. 31, 1964, Ser. No. 422,491
11 Claims. (Cl. 260—94.9)

The present invention relates to an improved process for the production of ethylene polymers. More particularly, it relates to the production of ethylene polymers having improved optical properties by polymerization of ethylene at superatmospheric pressures and elevated temperatures.

It is well known that normally solid polymers of ethylene can be produced by subjecting ethylene together with a suitable catalyst to temperatures in the range from about 50° to 400° C. and pressures in the range from 5,000 to 60,000 p.s.i. The catalysts employed in the reaction are free-radical-generating compounds such as organic peroxides, per-salts, oxygen, azo compounds such as diazomethane, azonitriles, etc., and the like. Large quantities of ethylene polymers produced in this way are employed in the production of film which is used in many applications, including packaging. For these uses, it is necessary that the polyethylene have good optical properties and particularly a high clarity.

To obtain the desired physical properties in the ethylene polymers, certain additives or polymerization modifiers are employed in the polymerization process. Among these are so-called chain-transfer agents by which the molecular weight of the polymer, in particular, can be controlled. Particular advantages such as better heat transfer and better optical properties in the polymer are known to be obtained in a continuous polymerization process when the initial portion of the polymerization reaction is heavily modified, that is, when the concentration of the modifier is at a high level initially. However, chain-transfer agents possess varying degrees of activity and when this practice is followed with conventional chain-transfer agents such as hydrocarbons, alcohols, ketones, etc., the entire reaction is heavily modified. Consequently, such transfer agents cannot be used in the desired quantity in the initial stage of the continuous polymerization reaction because the melt index of the product becomes too high. One way to circumvent this difficulty is to use a "depletable" transfer agent, that is, one which has a sufficiently high degree of activity that it is used up at such a rate that its concentration decreases as the reaction proceeds. It is an object of this invention, therefore, to provide a class of compounds which are considerably more active as chain-transfer agents in the polymerization of ethylene than those known in the art.

It is another object of the invention to provide an improved process for the polymerization of ethylene.

These and other objects and advantages of the invention which will become apparent from the following description thereof are attained by polymerizing ethylene at elevated temperatures and pressures in the presence of a free-radical initiator or catalyst for the polymerization and as a chain-transfer agent a phosphine of the formula $R^1R^2PH$ wherein $R^1$ and $R^2$ can be hydrogen or an alkyl group having from 1 to 8 carbon atoms. Examples of such compounds include phosphine, methyl phosphine, ethyl phosphine, n-butyl phosphine, amyl phosphine, hexyl phosphine, octyl phosphine, dimethyl phosphine, diethyl phosphine, dipropyl phosphine, diisopropyl phosphine, di-n-butyl phosphine, dihexyl phosphine, dioctyl phosphine, and the like. Preferably, the polymerization is conducted in the presence of a conventional polymerization modifier as well.

The amount of the phosphine chain-transfer agent required depends upon the particular phosphine used, the properties desired in the polymer product and the temperature and pressure conditions employed in the polymerization. Only a small proportion, not usually more than 0.1 mole percent, based on the total feed gas composition, is required. Generally, the amount initially present should be between about 0.0001 and 0.05 mole percent. Preferred amounts are those from about 0.001 to 0.025 mole percent.

The polymerization can be carried out continuously, semi-continuously are batchwise in any of the conventional equipment for high pressure ethylene polymerization by single stage or multi-stage processes using either autoclave or elongated tubular reactors in accordance with usual practices. The depletable chain-transfer agent of the invention can be introduced into the reactor in a variety of ways but preferably is introduced with the ethylene monomer. Where a tubular reactor is used and ethylene (together with initiator) is injected into the reactor at one or more points along its length, the chain-transfer agent of the invention need not be injected at all points and it can, for instance, be injected only at a point or points nearer the upstream end of the reactor. Often, the polymerization process is a cyclic one, and the chain-transfer agent can then be added to the recycled ethylene along with "make-up" ethylene. Precaution should be taken to handle the phosphine chain-transfer agents in the absence of air. Although these compounds can be used in the polymerization reaction proper in conjunction with oxygen or air as the polymerization initiator, they pose operational hazards because of their tendency to ignite in air.

Any of the free-radical-generating compounds well known in the art for polymerizing ethylene or mixtures of them may be used as initiators or catalysts in the polymerization reaction of the invention. These include oxygen; organic peroxides and more especially dialkyl peroxides such as, for example, di-tert-butyl peroxide; alkyl hydroperoxides such as tert-butyl hydroperoxide or cumene hydroperoxide; acyl peroxides, for example, acetyl or benzoyl peroxide; organic peracids such as, for example, perbenzoic acid, or the esters thereof such as tert-butyl perbenzoate; diperoxy dicarbonate esters such as diisopropyl peroxy dicarbonate; inorganic peroxides such as hydrogen peroxide or persulfates; azo compounds such as azobisisobutyronitrile, methylazoisobutyrate, diethyl 2,2'-azobis-(2-methyl propionate), and the like. The organic peroxides are preferred with mixtures such as those of lauroyl peroxide and di-tert-butyl peroxide in various proportions being particularly useful in some instances. However, the invention in no way resides in the nature of the particular initiator or catalyst employed. Only minor amounts of initiator are required. In general, the initiator concentration sufficient to produce satisfactory polymers may vary from about 0.0005 to 2 mole percent and preferably will be in the range from 0.001 to 0.02 mole percent based on the ethylene.

The conditions of temperature and pressure suitable in the process of the invention are those generally employed in the art for polymerization of ethylene and these can vary over a wide range depending upon the nature of the initiator employed. Temperatures from 40° C. to about 400° C. can be used although it is preferred to operate at temperatures from about 100° to about 300°

C. Similarly, a wide range of pressures from about 5,000 p.s.i. to about 60,000 p.s.i. can be employed. Pressures in the range from about 20,000 to about 40,000, however, are the preferred ones.

The polymerization can be carried out in the additional presence of a polymerization modifier having a reactivity sufficiently low that it will be used up at a rate such that its concentration increases with respect to ethylene as the polymerization proceeds. This modifier can be one of the substances commonly used for this purpose such as a saturated aliphatic hydrocarbon having from 1 to 8 carbon atoms or a mixture of such hydrocarbons, examples of which are the normal and branched chain acyclic paraffins such as propane, n-butane, isobutane, pentane, isopentane, hexane, and the like, cycloparaffins such as cyclopentane and cyclohexane, and alkyl cycloparaffins such as methylcyclohexane. Lower aliphatic aldehydes, i.e., those containing no more than five carbon atoms, as well as aromatic aldehydes such as benzaldehyde also give good results. Other suitable polymerization modifiers include alcohols such as isopropanol; aromatic hydrocarbons such as toluene or xylene; esters such as ethyl acetate or methyl formate; ethers such as tetrahydrofuran or dioxane; ketones such as acetone or methyl ethyl ketone; phenols, and various other substances such as hydrogen and carbon dioxide. The amount of the non-depletable modifier initially present need not exceed 15 mole per cent of the ethylene. Generally, from about 0.1 to about 15 mole percent based on the ethylene is used. The preferred amounts are those in the range from about 0.5 to 10 mole percent.

The process of the invention is not restricted to homopolymerization of ethylene. Ethylene may be copolymerized as well with other polymerizable compounds employing the phosphine chain-transfer agents herein described. Suitable comonomers include, for example, vinyl and vinylidene hydrocarbons having from 3 to 8 carbon atoms such as propylene, butene-1, isobutylene and other olefins and isoolefins; halogen substituted hydrocarbons such as vinyl chloride, vinyl fluoride, vinylidene chloride, vinylidene fluoride, 1,1-chlorofluoroethylene, etc.; vinyl esters such as vinyl acetate, vinyl butyrate, vinyl propionate; vinyl ethers including vinyl methyl ether, vinyl ethyl ether, vinyl octyl ether, and the like; acrylic acid; acrylonitrile, acrylic esters including methyl, ethyl, propyl, etc., acrylates; acrylamide; α-substituted acrylic acids, nitriles, esters, and amides such as methacrylic acid, methacrylonitrile, methyl methacrylate, ethyl methacrylate, methacrylamide, etc.; the acids, esters, and amides of $\alpha,\beta$-ethylenically unsaturated dicarboxylic acids such as fumaric, maleic, citraconic, itaconic, etc., and the like. If a copolymer is prepared by the process of this invention, to should contain more than 50% by weight of ethylene.

The invention is illustrated in the following examples which, however, are not to be construed as limiting it in any manner whatsoever.

EXAMPLE 1

A series of polymerization runs were made in which ethylene was polymerized alone and in the presence of phosphine and di-n-butyl phosphine using di-tert-butyl peroxide as the polymerization initiator. The procedure employed for the polymerizations follows. After careful purging of the steel bomb used as the polymerization reactor together with lines connected thereto to eliminate all traces of air or oxygen, the bomb was filled with ethylene, phosphine when it was used, and a small quantity of propane at an elevated temperature and atmospheric pressure. By means of a hypodermic needle, a small amount of di-tert-butyl peroxide in an inert solvent, and dibutyl phosphine when it was used, was injected into the compartment of the bomb in such a manner as to exclude all air or oxygen. Additional hot ethylene was pumped into the bomb until the pressure reached approximately 7500 p.s.i. while the temperature was maintained at about 130° C. The mechanical agitator inside the bomb was started and the di-tert-butyl peroxide used as the polymerization initiator was forced into the bomb by means of high pressure ethylene. The bomb was then pressured by means of an ethylene pump to the final conditions of 20,000 p.s.i. and 130° C. The di-tert-butyl peroxide was present in an amount equal to $2.07 \times 10^{-4}$ moles per liter of reactor volume at 20,000 p.s.i. and the propane modifier made up 14.43 percent of the total charge to the reactor, the remainder being ethylene containing less than 1% inert solvents. The data obtained are presented in Table I.

From the data in Table I, the chain-transfer constants presented in Table II were calculated using the procedure of obtaining the number average molecular weight, $\overline{M}_n$, from the melt index (MI) explained in J. Appl. Polymer Sci., 8, 839–47 (1964), and the method of calculation of Mayo in J. A. Chem. Soc., 65, 2324 (1943). The chain-transfer constant $C_s$ is defined as $C_s = k_s/k_p$ where $k_s$ is the reaction rate constant for transfer and $k_p$ is the propagation rate constant for ethylene. When $C_s$ is less than 1, the concentration of transfer agent relative to unreacted ethylene will increase as polymerization increases. This is actually observed in continuous reactors for conventional modifiers. Only if $C_s$ is greater than 1 can modifier concentration relative to unreacted ethylene decrease.

TABLE I

| Run No. | Time (min.) | Transfer Agent | Transfer Agent Conc., Mole Percent | Rate, Percent/hour | Melt Index |
|---|---|---|---|---|---|
| 1 | 54 | None | | 7.7 | 0.55 |
| 2 | 57.5 | do | | 7.4 | 0.50 |
| 3 | 53 | Di-n-butyl phosphine | 0.025 | 10.2 | 265.0 |
| 4 | 58 | do | 0.013 | 10.5 | 82.0 |
| 5 | 19 | Phosphine | 0.0043 | 7.5 | 99.0 |
| 6 | 19 | do | 0.0031 | 7.4 | 192.0 |
| 7 | 20 | do | 0.0043 | 4.4 | 322.0 |

TABLE II

| Compound | $C_s$ |
|---|---|
| Di-n-butyl phosphine | 3.6 |
| Phosphine | 22 |

EXAMPLE 2

Following the procedure described in Example 1, ethylene was polymerized in a series of experiments using 14.43 percent propane as a modifier under exactly the same conditions of temperature and pressure as in that example and using the same concentration of the identical initiator but employing instead of the phosphine compounds, a number of different chain-transfer agents well known in the art. From the data obtained, the chain-transfer constant for each compound was calcualted in the manner described in the previous example. These are presented below in Table III.

TABLE III

| Compound | $C_s$ |
|---|---|
| Propylene | 0.0146 |
| Toluene | 0.0129 |
| Hydrogen | 0.016 |
| Cyclohexane | 0.0091 |
| Chloroform | 0.29 |
| Carbon tetrachloride | 0.98 |
| Isopropanol | 0.014 |
| Benzaldehyde | 0.174 |
| Methyl chloroacetate | 0.112 |

EXAMPLE 3

The utility of phosphine as a chain-transfer agent with other initiators and under different conditions of temperature and pressure was established by polymerizing ethylene alone and in the presence of phosphine in the manner described in Example 1. The data obtained are presented below in Table IV under the indicated conditions.

| Run No. | Temp., °C. | Press., p.s.i.g. | Time (min.) | Initiator | Initiator Conc., Mole/liter | Phosphine Conc., Mole percent | Rate, percent/hour | Melt Index |
|---|---|---|---|---|---|---|---|---|
| 8 | 220 | 20,000 | 38 | Oxygen | $7.6 \times 10^{-5}$ | 0.0036 | 4.8 | 1.1 |
| 9 | 205 | 30,000 | 39 | Azoisopropane | $2.07 \times 10^{-4}$ | 0.0030 | 8.6 | 0.0012 |
| 10 | 202 | 30,000 | 36 | ----do---- | $2.07 \times 10^{-4}$ | 0.0033 | 6.1 | 0.0017 |
| 12 | 205 | 30,000 | 13 | ----do---- | $2.07 \times 10^{-4}$ | None | 10.3 | (1) |

[1] Too hard.

The foregoing data clearly demonstrate the utility of the phosphines of the invention as chain-transfer agents in the polymerization of ethylene under varying conditions of temperature and pressure with different polymerization initiators. A comparison of the chain-transfer constants in Tables II and III establishes that the phosphines function as depletable chain-transfer agents and thus provide the process and product advantages previously mentioned which are attainable with such agents and characterize them as definitely superior to the chain-transfer agents known in the art.

What is claimed is:

1. The process for producing ethylene polymers which comprises polymerizing ethylene at elevated temperatures and pressures in the presence of an amount sufficient to initiate said polymerization of a free-radical-generating compound and as a chain-transfer agent a minor amount of phosphine.

2. The process of claim 1 wherein the amount of said phosphine is in the range from about 0.0001 to about 0.05 mole percent.

3. The process of claim 2 wherein the polymerization is conducted at a temperature from about 40° to about 400° C. and at a pressure from about 5,000 to about 60,000 p.s.i.

4. A process for producing ethylene polymers which comprises polymerizing ethylene at a temperature from about 40° to about 400° C. and a pressure from about 5,000 to about 60,000 p.s.i., in the presence of an amount sufficient to initiate said polymerization of a free-radical-generating compound chosen from the group consisting of oxygen, dialkyl peroxides, acyl peroxides, alkylhydroperoxides, inorganic peroxides, organic peracids and esters thereof, diperoxydicarbonate esters and azo compounds and as a chain-transfer agent a minor amount of phosphine.

5. The process of claim 4 wherein the amount of said phosphine is in the range from about 0.0001 to about 0.05 mole percent.

6. The process for producing ethylene polymers which comprises polymerizing ethylene at a temperature from about 40° to about 400° C. and a pressure from about 5,000 to about 60,000 p.s.i. in the presence of an amount sufficient to initiate said polymerization of a free-radical-generating compound chosen from the group consisting of oxygen, dialkyl peroxides, acyl peroxides, alkylhydroperoxides, inorganic peroxides, organic peracids and esters thereof, diperoxydicarbonate esters and azo compounds, as a chain-transfer agent a minor amount of phosphine and a polymerization modifier having a reactivity sufficiently low that it will be used up at a rate such that its concentration increases with respect to ethylene as the polymerization proceeds.

7. The process of claim 6 wherein said polymerization modifier is chosen from the group consisting of saturated aliphatic hydrocarbons having from 1 to 8 carbon atoms and mixtures thereof, aromatic hydrocarbons, lower aliphatic aldehydes, alcohols, ketones, ethers, esters, phenols, hydrogen and carbon dioxide.

8. A process for producing ethylene polymers which comprises polymerizing ethylene at a temperature from about 100° to about 300° C. and a pressure from about 20,000 to about 40,000 p.s.i. in the presence of an amount of di-tert-butyl peroxide sufficient to initiate said polymerization and from about 0.001 to about 0.025 mole percent of phosphine as a chain-transfer agent.

9. The process of claim 8 wherein said polymerization is conducted in the additional presence of propane as a polymerization modifier.

10. A process for producing ethylene polymers which comprises polymerizing ethylene at a temperature from about 100° to about 300° C. and a pressure from about 20,000 to about 40,000 p.s.i. in the presence of an amount of oxygen sufficient to initiate said polymerization and from about 0.0001 to about 0.025 mole percent of phosphine as a chain-transfer agent.

11. A process for producing ethylene polymers which comprises polymerizing ethylene at a temperature from about 100° to about 300° C. and a pressure from about 20,000 to about 40,000 p.s.i. in the presence of an amount of azoisopropane sufficient to initiate said polymerization and from about 0.001 to about 0.025 mole percent of phosphine as a chain-transfer agent.

References Cited

UNITED STATES PATENTS 3,129,212   4/1964   Mortimer _____ 260—94.9

OTHER REFERENCES

Pellon: J. Poly. Sci., XLIII, 537–548, 1960.

JOSEPH L. SCHOFER, *Primary Examiner.*

M. B. KURTZMAN, *Assistant Examiner.*